Figure 1:
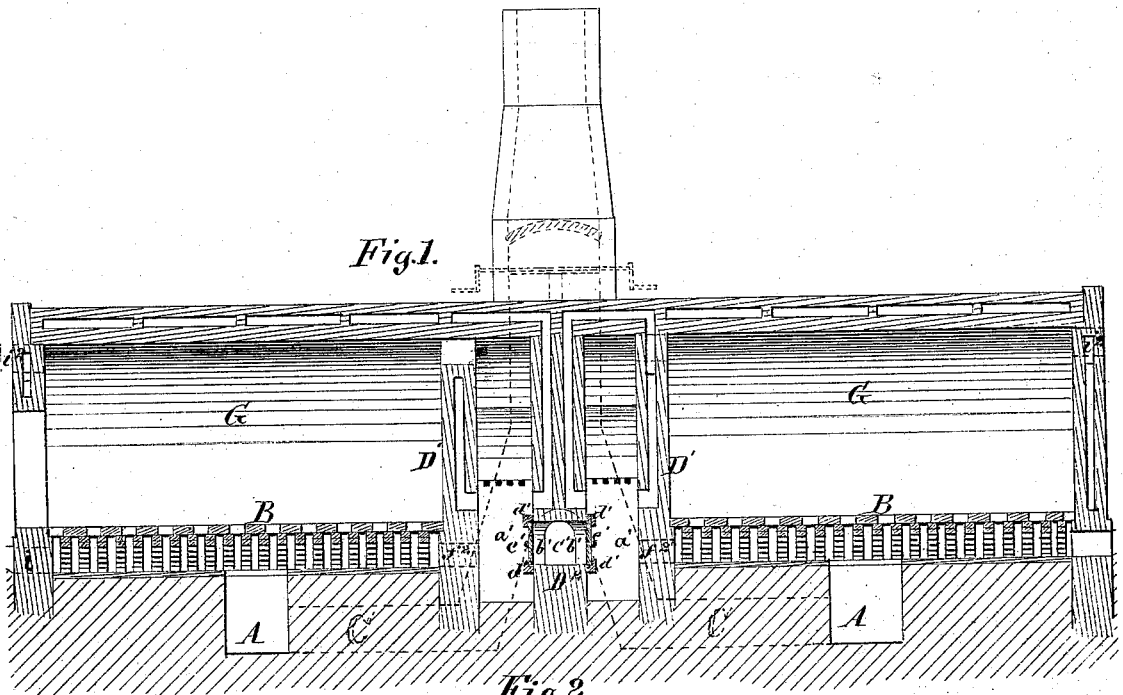

B. R. HAWLEY.
Improvement in Brick Kilns.

No. 125,292.                                               Patented April 2, 1872.

Witnesses                                                  Inventor
Edward Maddock                                             B. R. Hawley
James C. Ayer                                              by A. R. Morgan
                                                           Att'y

UNITED STATES PATENT OFFICE.

BENJAMIN R. HAWLEY, OF NORMAL, ILLINOIS, ASSIGNOR TO ALONZO R. MORGAN, OF NEW YORK CITY.

IMPROVEMENT IN BRICK-KILNS.

Specification forming part of Letters Patent No. 125,292, dated April 2, 1872.

Specification describing certain Improvements in Brick-Kilns, invented by BENJAMIN R. HAWLEY, of Normal, McLean county, State of Illinois.

My present invention relates to that class of kilns which work on the "down-draught" principle; the heat passing from the top down through the bricks and a perforated floor at the bottom, and in which the remaining heat in a burned compartment is utilized to heat the bricks in another or to feed the fire.

The first part of the invention consists of a new mode of burning in kilns of this character, by which, at the begining of the burning, I apply a strong fire and keep it up regularly throughout, in order to follow immediately the descending stratum of moisture (of steam) expelled from the hot bricks, by a stratum of intense heat, retarded by the stratum of steam, to burn the bricks as quickly as possible after the drying, by which I gain a considerable saving in the amount of heat necessary to do the burning, because in this case they burn quicker than when dried by a slow fire and then burned by a fire afterward increased, as in the common way. I also gain a considerable saving of heat by the aid of this stratum of steam, which acts as a kind of descending damper in advance of the heat and prevents, to a considerable extent, the escape of heat through the chimney that takes place when the burning is continued after the moisture is expelled and the passages become free of heat to any degree. The wet bricks contain a large amount of water, which, being expelled by the heat, forms this stratum of steam, which is gradually forced down upon and among the cold bricks and condensed by them, or partly so, to be revaporized again as the heat stratum comes down, while, at the same time, it resists the escape of heat above 212° or thereabout without obstructing the draught, so that the heat stratum above is kept very high and capable of very quickly doing its work on the dried bricks a short distance above the steam stratum. In order to hold this heat stratum back in the lowermost part of the kiln long enough after the steam has past the lowermost courses for the heat, now surrounding and below them, to burn them completely, I find it necessary, in order to compensate for the want of other bricks from which to obtain the necessary steam to maintain this steam-damper, to provide a large chamber or well capable of storing up much of the drip from above during the fore part of the burning, to be now converted into steam, and maintain the supply till the burning is completed; and this chamber or well, if not equal in size to the kiln above, I locate at the center, and so connect it with the flue, that the heat stratum finally reaching it will flow from all sides alike into it to equalize the action throughout; but, in practice, I find it necessary to have said well very large, and it will be all the better to have it equal in diameter with the kiln and considerably deeper than the ordinary chambers used under the kiln-floors for flues.

The second part of my invention consists of an arrangement of the dampers for the connecting-passages below the furnaces, calculated to render them less objectionable in respect of collecting the droppings from the furnaces, and being so loaded thereby as to interfere with their operation.

The third part of the invention consists in having a passage from under or below the floor of each compartment to the main connecting-passages under the kilns for conducting the remaining heat of a burned compartment to another compartment or its furnace in connection with cold-air inlets, either at the bottom or the top of the compartments, whereby I may draw off said remaining heat from the bottom as well as at the top, as I have heretofore only done.

Figure 2:
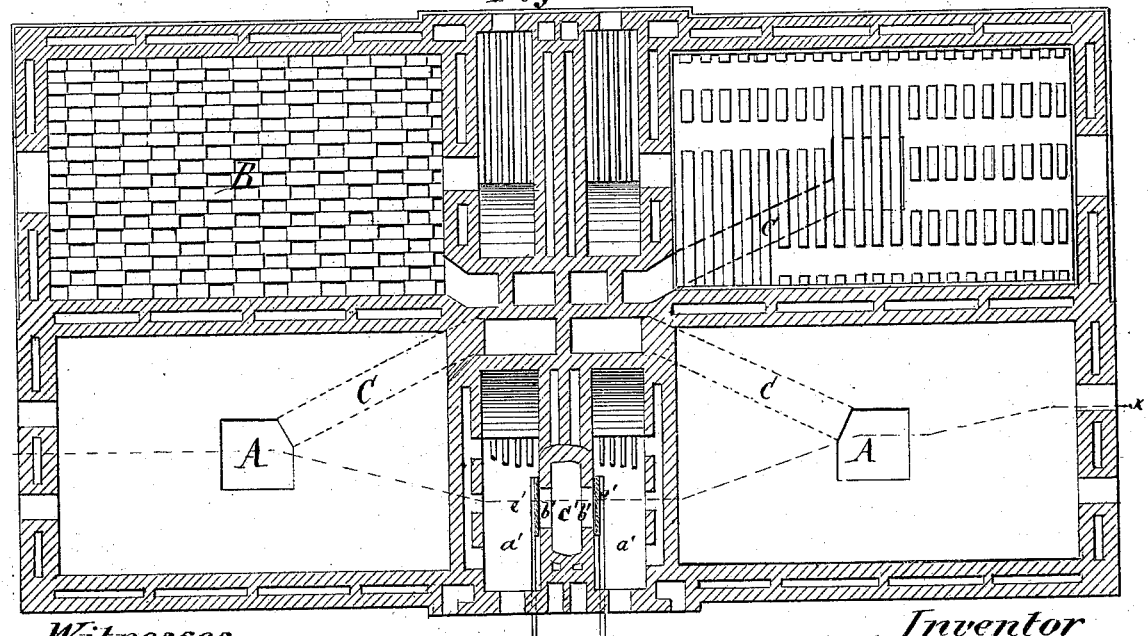

Figure 1 is a longitudinal sectional elevation of my improved kiln taken on the line $x\, x$ of Fig. 2, and Fig. 2 is a horizontal section.

I have found by extensive practical experiments that it is decidedly efficacious, in order to secure the greatest advantage of this down-draught process, to follow immediately the descending stratum of moisture (steam) or damp material, bricks, &c., with a degree of heat sufficient to complete the process of burning at once and without drying the material far in advance, as has heretofore been done; and in doing this I avail myself of the sub-stratum of gravitating steam generated from the green material to retain the descending stratum of heat, as it acts like a movable damper, preventing the rapid escape of heat from the oven until after the contents are thorough burned, while it does not materially obstruct the draught; and to complete the burning of the lowermost courses of bricks a quantity of moisture must be retained, after that of the bricks has been expelled from them, to maintain the stratum of high heat on the said lower courses for a considerable time after the said automatic damper has passed below (say about four feet, more or less,) and there are no more wet bricks from which to keep up the supply. I therefore find it necessary to the successful operation of this method of burning to form a sufficiently ample chamber or well, A, under each perforated floor B of the burning-compartments G; said well being, in case it is of lesser size than the compartments, located at the center. C represents the escape-passage, leading from the said well or chamber to the chimney to maintain the draught. This chamber serves as a reservoir for the retention of condensed steam to retard the descent of the heat stratum until the completion of the burning of the lower courses. This reservoir during my process of burning becomes filled with saturated steam, and also contains more or less water from condensation, which serves to supply the steam for the aforesaid automatic damper after all the moisture is expelled from the bricks to retard the heat stratum until the completion of the burning, which must continue on the lower courses for a considerable time after the said steam stratum has been forced below them. This could not be accomplished by a mere draught-flue extending downward from under the kiln-floor, for such a flue would be insufficient to contain the requisite amount of moisture; consequently the flue would quickly become dry and free when the heat stratum had reached the lower courses, after which the heat stratum could no longer be maintained as high as required, and the lower courses would not be completely burned, whereas by the aid of a reservoir for the steam and water of sufficient capacity the burning is uniform throughout.

I now propose to arrange the dampers $e'$ of passages $b'$ in vertical planes on the sides of the walls $D^2$, with upper and lower grooved supports $d'$, in which they can slide forward and back in opening and closing, whereby they will not, as heretofore arranged horizontally under the grates, be loaded with the droppings from the furnaces, which greatly obstruct their operation.

I also now propose to arrange passages, $f^2$, (shown dotted,) through the walls $D^1$, to be used in connection either with the cold air inlet-passage $i^1$, at the bottom of the compartment, or with others, $i^2$, at the top, for conducting cold air through the compartments while hot, after burning, to take up the heat and utilize it in another compartment, or for feeding fire or supplying a connected dry-house.

This arrangement differs from the one described in my patent No. 118,364, only in that the air admitted at the bottom will rise among the hot burned material, and then be drawn down again through the passage $f^2$ into the main connecting-passages $b^1 c^1$; or, if admitted at the top through the said burned material, instead of passing upward to the top of the furnace and down through it, which I find desirable in some cases or certain conditions of the heat in the cooling compartment.

I claim as my invention—

1. The method of burning bricks, &c., by a descending stratum of intense heat, retarded by and following a slower descending stratum of condensed or saturated steam, maintained conterminously throughout the burning process; also the continuation of these stratums below the lower courses of bricks; the steam necessary for the retention of the stratum of heat till the completion of the burning of the lower courses being retained in an ample chamber below the floor, all substantially as specified.

2. I also claim the dampers $e'$ for controlling the connecting-passages below the furnaces, arranged to work against the sides of the walls $D^2$ in such manner as not to receive the droppings from the furnaces, substantially as specified.

3. I also claim the arrangement of the passages $f^2$ from the compartments to the main connecting-passages $b' c'$ below the floors with cold-air inlet openings to the compartments either at the bottom or top, substantially as specified.

The foregoing specification of my improvements in brick-kilns signed by me this 1st day of January, 1872.

B. R. HAWLEY.

In presence of—
S. W. SQUIRES,
A. F. DICKINSON.